INVENTOR.
MALBONE W. GREENE

BY

ATTORNEY

May 16, 1972   M. W. GREENE   3,663,409
PRESSURE COMPENSATION OF MEMBRANE-TYPE SENSORS
Filed May 14, 1970   3 Sheets-Sheet 3

INVENTOR.
MALBONE W. GREENE
BY Thomas L. Peterson
ATTORNEY

United States Patent Office 3,663,409
Patented May 16, 1972

3,663,409
PRESSURE COMPENSATION OF MEMBRANE-TYPE SENSORS
Malbone W. Greene, Covina, Calif., assignor to Beckman Instruments, Inc.
Filed May 14, 1970, Ser. No. 37,267
Int. Cl. G01n 27/30
U.S. Cl. 204—195 P
14 Claims

ABSTRACT OF THE DISCLOSURE

In a sensor for measuring the quantity of a substance in a composition of matter of the type including a membrane which is permeable to the substance and substantially impermeable to liquid and ions, the permeability of the membrane being a function of the pressure thereon, the sensor providing an electrical output signal which is a function of the quantity of the substance in the composition of matter, there is disclosed an improvement consisting of a method and means for accurately compensating the output of the sensor for the effect of pressure upon membrane permeability by multiplying the output signal by the function $e^{kp}$ thus cancelling the pressure effect which is given by the function $P_0 e^{-kp}$ where $P_0$=membrane permeability at zero pressure, $p$=absolute pressure, and $k$=a membrane constant. According to a preferred embodiment of the invention, such multiplication is achieved through the use of a pressure-driven, variable resistance in the feed-back loop of an operational amplifier.

BACKGROUND OF THE INVENTION (1) Field of the invention

The present invention relates generally to diffusion limited, membrane-type sensors and, more particularly, to a simple and accurate means for compensating the output of such a sensor for the effect of pressure upon membrane permeability.

(2) Description of the prior art

The present invention is applicable and relates to diffusion limited sensors for measuring the quantity of a substance in a composition of matter of the type including a membrane which is permeable to such substance and substantially impermeable to liquid. Such sensors are capable of providing a direct measurement of the quantity of the substance by noting the effect of that substance upon the electrical characteristics of an electrochemical polarographic cell.

One example of a membrane-type sensor is disclosed in U.S. Pat. No. 2,913,386 issued Nov. 17, 1959 to Leland C. Clark, Jr. for Electrochemical Device for Chemical Analysis. As described therein, such a sensor consists of an anode and a cathode which are electrically connected through a liquid electrolyte which is physically isolated and electrically insulated from the composition to be analyzed by a thin membrane which is permeable to the substance which it is desired to measure in the composition, and which membrane is substantially impermeable to the electrolyte. Commonly, the sensor is utilized to determine the partial pressure or concentration of a dissolved gas, such as oxygen, in a liquid sample, such as water. The membrane is usually a plastic such as polytetrafluoroalkane (Teflon) which is permeable to gases and substantially impermeable to ions and liquid.

In operation, a small electrical potential is applied across the anode and cathode. The dissolved gas diffusing through the membrane passes through the electrolyte and is either oxidized or reduced electrochemically at the cathode, producing a small output current which is directly proportional to the partial pressure of the gas. Alternatively, by proper choice of sacrificial electrodes and electrolytes, no external source of potential need be applied.

The sensor output current, proportional to the partial pressure of the dissolved gas in the sample, varies with temperature due to the fact that the permeability of the diffusion limiting membrane is a function of temperature. It is therefore common, in such sensors, to mount at least one temperature sensitive element, such as a thermistor, to sense the temperature of the sample and to use such temperature sensitive element to compensate the sensor output current for changes in temperature. One prior art approach is to utilize such thermistor in the feed-back network of an operational amplifier in order to achieve steady-state thermal compensation of the sensor output current so that such output is directly proportional to the partial pressure of the gas.

It is also known that the solubility of gases in water is a function of water temperature. Consequently, the concentration of a dissolved gas in water saturated with gas having a given gas partial pressure decreases rapidly with increasing temperature. Therefore, in some diffusion limited sensors, allowance for this effect is made by multiplying the partial pressure of the gas by the proper function of sample temperature. Again, this multiplication may be accomplished by an operational amplifier having a thermistor in its feed-back network.

Still another effect on the operation of diffusion limited sensors has been noted, namely the direct effect of hydrostatic pressure variations on the sensor output current. More specifically, the permeability of a membrane to oxygen as well as other gases decreases with increasing hydrostatic pressure. However, while other investigators have noted the effect of hydrostatic pressure on the output current of diffusion limited sensors, none of such investigators have, heretofore, suggested any feasible or practical techniques for compensating such sensor output signal for such changes in pressure. While such compensation may not be required where significant changes in pressure are not encountered, many situations exist where such compensation is essential.

SUMMARY OF THE INVENTION

According to the present invention, there is provided a means for compensating the output signal of diffusion limited, membrane-type sensors for the effect of hydrostatic pressure variations. The present system performs such compensation simply, without the necessity for complex computations. In addition, the present technique is capable of accurate compensation which will provide an error of less than 1% of dissolved gas reading in the range of 0 to 5,000 p.s.i.

Briefly, the present method and means for accurately compensating the output signal of a diffusion limited sensor for changes in the pearmeability of the membrane due to changes in pressure operates by performing a multiplication on the output signal by a function which varies as the reciprocal of the change in membrane permeability with pressure. Such multiplication may be achieved, most simply and with minimum expense, by utilizing a pressure-driven, variable resistance in the feed-back loop of an operational amplifier. More specifically, the output of the sensor, which has been suitably compensated for temperature effects, may be applied to the input of such a pressure-compensating operational amplifier. According to one embodiment of the present invention, a linear, pressure-driven, variable resistance is utilized, which potentiometer is tailored with series and shunt resistors to provide the proper gain as a function of pressure to cancel pressure effects. According to another embodiment of the present invention, such series and shunt resistors may be eliminated by the use of a special non-linear potentiometer.

It is therefore an object of the present invention to provide an improvement in diffusion-limited sensors.

It is a further object of the present invention to provide a simple means for accurately compensating the output of a membrane-type sensor for the effect of pressure upon membrane permeability.

It is a still further object of the present invention to provide a means for compensating the output signal of a membrane-type sensor for the effect of pressure upon membrane permeability by multiplying such output signal by a function which varies as the reciprocal of the change in membrane permeability with pressure.

It is another object of the present invention to compensate the output of a membrane-type sensor for changes in the permeability of the membrane due to changes in pressure by the use of a pressure-driven variable resistance in the feed-back loop of an operational amplifier.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

DESCRIPTION OF THE PREFERRED EMBODIMENTS

Figure 1:
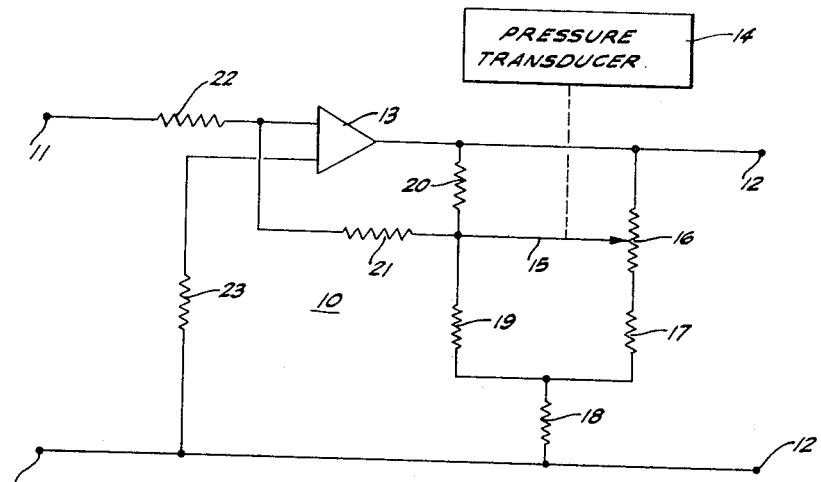
FIG. 1 is a circuit diagram of a first embodiment of means for compensating the output signal of a diffusion limited sensor for changes in membrane permeability due to changes in pressure.

Referring now to the drawings and, more particularly, to FIG. 1 thereof, the output current of a diffusion limited, membrane-type sensor varies with changes in hydrostatic pressure due to the fact that the permeability of the diffusion limiting membrane is a function of pressure. A series of tests performed with membranes of different materials indicates that the magnitude of the pressure effect is dependent upon the particular membrane material. Such tests indicate that the membrane permeability is an exponential function of hydrostatic pressure in accordance with the equation:

$$P_m = P_o e^{-kp} \quad (1)$$

where:

$P_m$ = membrane permeability at pressure $p$;
$P_o$ = membrane permeability at zero pressure;
$p$ = absolute pressure; and
$k$ = a membrane constant, independent of temperature in the range of zero to 35° C.

As examples of typical membrane materials, for FEP Teflon, $k$ is approximately 0.00012 per p.s.i., resulting in a loss of sensor sensitivity of about 12% at 1,000 p.s.i. compared to the value at zero pressure. The sensor output with FEP Teflon would decrease by approximately 44% at 5,000 p.s.i. Mylar appears to have a coefficient which is about one-twelfth as large as FEP Teflon and Paralene has a coefficient about one-sixth as large as FEP Teflon.

In accordance with the present invention, the effect of hydrostatic pressure variations on the sensor output current may be compensated for by performing an analog multiplication of the sensor output current by the reciprocal of the exponential term of the function represented by Equation 1; that is, the sensor output is multiplied by $e^{kp}$, thereby canceling the exponential term in Equation 1. According to a first embodiment of the present invention, this analog multiplication by $e^{kp}$ may be achieved by the circuit, generally designated 10, shown in FIG. 1.

Circuit 10 includes a pair of input terminals 11 which receive a pressure dependent analog output voltage, proportional to the sensor current which has, preferably, been compensated for the effect of temperature on membrane permeability and is, therefore, directly proportional to the partial pressure of the gas in the sample. Optionally, the input signal at terminals 11 may also be compensated for the effect of sample temperature on the solubility of the gas. Circuit 10 also includes a pair of output terminals 12 which provide a pressure compensated analog voltage which is directly proportional to either the partial pressure or the concentration of the dissolved gas.

Broadly speaking, circuit 10 utilizes an operational amplifier 13 connected in circuit between terminals 11 and 12 to multiply the input signal to derive the output signal. Circuit 10 includes a pressure transducer 14 mounted to sense the hydrostatic pressure on the diffusion limiting membrane. Pressure transducer 14 is mechanically connected to the arm 15 of a variable resistance 16 which is connected in the feed-back circuit of operational amplifier 13. More specifically, one end of resistance 16 is connected to one of terminals 12, the other end being connected to one end of a resistance 17. The other end of resistance 17 is connected to one end of each of a pair of resistances 18 and 19 the other end of resistance 18 being connected to the other one of output terminals 12. The other end of resistance 19 is connected to arm 15 of variable resistance 16 as well as to one end of each of a pair of resistances 20 and 21, the other end of resistance 20 being connected to the first one of output terminals 12. The other end of resistance 21 is connected to a first input of operational amplifier 13, which is also connected to a first one of input terminals 11 via a resistance 22. The other one of input terminals 11 is connected directly to the other one of output terminals 12 as well as to the other input of operational amplifier 13 via a resistance 23.

In circuit 10, variable resistance 16 is a linear element, series and shunt resistances 17–20 being utilized to tailor the proper gain of operational amplifier 13 as a function of pressure to cancel pressure effects. In other words, motion of arm 15 of variable resistance 16 due to pressure variations as sensed by pressure transducer 14 varies the gain of operational amplifier 13 to cancel the loss of output signal due to pressure. The values of resistances 16–20 are selected to provide the proper compensation function, to cancel the exponential term of Equation 1. These values are most conveniently determined with the aid of an electronic computer since the desired transfer function is known. As a specific example, for a sensor using a 0.0005 inch thick sheet of FEP Teflon as the membrane, when variable resistance 16 is 5,000 ohms and is driven full scale from 0 to 5,000 p.s.i., resistances 17–20 may have values of 1111, 3697, 12463, and 17645 ohms, respectively, for a precision of compensation of ±1% in the pressure range given. In this example, the value of resistances 21 and 22 would be 100 kilohms each. The values of resistances 21 and 22 affect the values of resistances 17–20. but in a minor way, and are primarily used to select the nominal gain of operational amplifier 13. Resistance 23 is normally approximately equal to the impedance of circuit 10 viewed from the junction of resistances 21 and 22, or it may be selected, if desired, for optimum thermal stability of operational amplifier 13. In the specific example cited above, the value of resistance 23 may be 51 kilohms.

Figure 2:
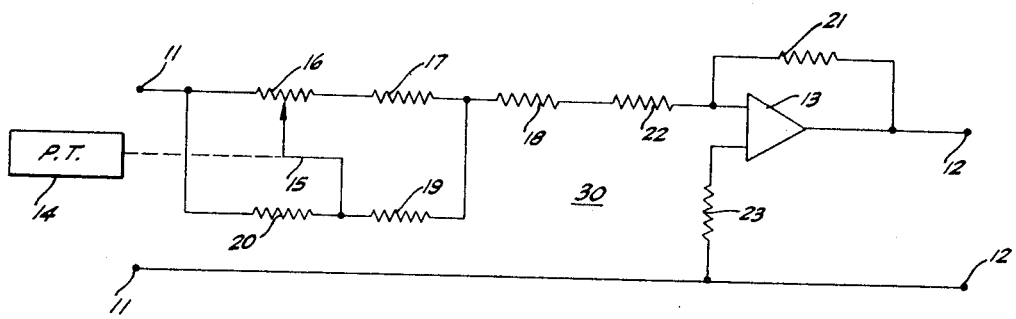
FIGS. 2 and 3 are circuit diagrams of alternate forms of the circuit shown in FIG. 1, each of the circuits of FIGS. 1-3 utilizing a linear, pressure-driven, variable resistance.

Referring now to FIG. 2, there is shown an alternate circuit, generally designated 30, which may be used instead of circuit 10 of FIG. 1 to achieve the same result.

Corresponding elements in both circuits have been given the same numerals. In circuit 30, pressure-driven, variable resistance 16 and its associated resistances 17–20 are used in the input circuit of operational amplifier 13 rather than in the output as in circuit 10. However, it should be noted that while the components of circuit 30 have numbers corresponding to those of circuit 10, the computed resistance values of the components would be very different in the two alternate circuits, such resistance values being determined by solution of the network equations. In the case of circuit 30, resistances 18 and 22 are simply in series, and hence either one may be eliminated.

Figure 3:
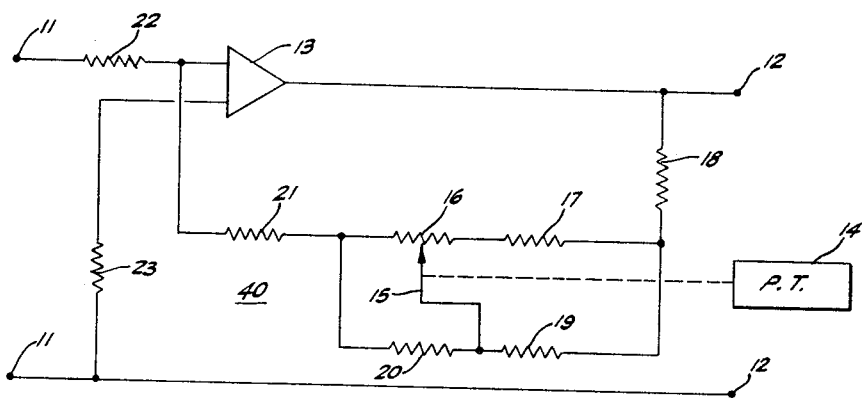

Referring now to FIG. 3, there is shown an alternate circuit, generally designated 40, which may be used instead of circuits 10 and 30 of FIGS. 1 and 2, respectively. Again, corresponding elements have been given the same numerals. In circuit 40, pressure-driven, variable resistance 16 and its associated trimming resistances 17–21 are again used in the feed-back loop of operational amplifier 13. Since resistances 18 and 21 are actually simply connected in series, one may be eliminated. As in the case of circuit 30, it should be understood that even though the components of circuit 40 have numbers corresponding to those of circuits 10 and 30, the resistance values of the components would be generally different.

Figure 4:
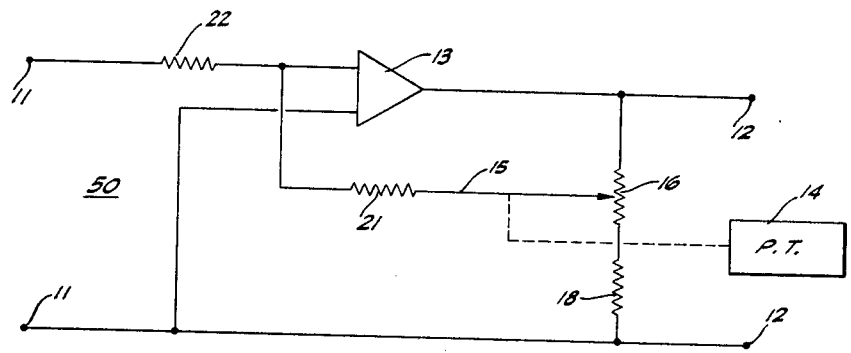
FIG. 4 is a circuit diagram of an alternate embodiment which may utilize a non-linear, variable resistance.

It should be noted with respect to circuits 10, 30 and 40 of FIGS. 1–3, respectively, that only resistances 16, 18, 21 and 22 are essential and that the use of additional resistances 17, 19 and 20 merely permits a more precise matching of the compensation network to the sensor's pressure coefficient. Therefore, and as shown in FIG. 4, such circuit components may be eliminated, either where a less precise circuit would be adequate or where the sensor has a relatively small pressure effect. Furthermore, although the circuit of FIG. 4, generally designated 50, provides less precise compensation with a linear, pressure-driven, variable resistance, circuit 50 could provide equal or superior compensation to circuits 10, 30 and 40 if variable resistance 16 was non-linear and designed to provide the proper compensation function as a function of changes in pressure.

Figure 5:
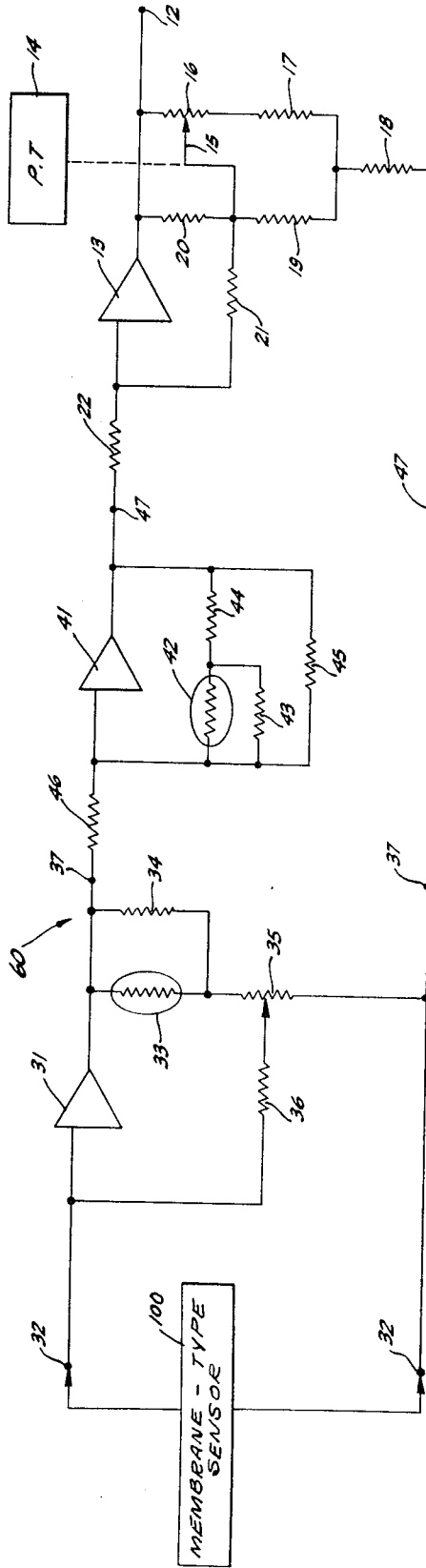

As stated hereinbefore, circuits 10, 30, 40 and 50 of FIGS. 1–4, respectively, assume that compensation for the effects of temperature on membrane permeability have been made prior to application of the sensor output signal to input terminals 11. This generalized approach is shown in FIG. 5 and has the advantages of simplicity and flexibility of design. Such circuit, generally designated 60, includes a partial pressure operational amplifier 31 which receives, at terminals 32, the output current from a diffusion limited, membrane-type sensor 100. Operational amplifier 31 includes a thermistor 33 in its feed-back circuit to compensate for the effect of temperature on the permeability of the membrane of sensor 100. More specifically, the network including operational amplifier 31 includes thermistor 33 mounted to sense the temperature of the sample in contact with the membrane. Thermistor 33 is connected in parallel with a resistance 34, such parallel combination being connected between the output of operational amplifier 31 and one end of a variable resistance 35, the arm of which is connected via a resistance 36 to the input of operational amplifier 31.

Variable resistance 35 is utilized to adjust the overall range of output voltage provided by circuit 60. The network consisting of thermistor 33 and resistances 34 and 35 varies the closed loop gain of amplifier 31 to provide an output at terminals 37 which is approximately independent of sample temperature and, therefore, proportional to the partial pressure of the gas in the sample. This output signal on terminals 37 is applied to a dissolved gas amplifier 41 which further amplifies the partial pressure output of amplifier 31 and converts partial pressure of the gas to concentration of dissolved gas by compensating for the effect of sample temperature on the solubility of gases in the sample. More specifically, the network including operational amplifier 41 includes an additional thermistor 42 connected in parallel with a resistance 43, this parallel combination being connected in series with a further resistance 44 between the output and input of amplifier 41. A resistance 45 is also connected between the output and input of operational amplifier 41. Finally, operational amplifier 41 receives the signal on terminals 37 via a resistance 46.

The network consisting of thermistor 42 and resistances 43–45 varies the closed loop gain of operational amplifier 41 to provide an output signal on terminals 47 which is proportional to the dissolved gas concentration in the sample. Finally, operational amplifier 13 and its associated components, as described previously with respect to FIGS. 1–4, provides a pressure compensated output on terminals 12 so that the resultant output, in concentration units, is independent of both pressure and temperature changes of the sample.

If desired, the positions of operational amplifiers 41 and 13 and their associated components in FIG. 5 may be interchanged to make both a pressure compensated, gas partial pressure output voltage and a pressure compensated, gas concentration output voltage available. In other words, if pressure compensation is accomplished immediately after operational amplifier 31, the output of amplifier 13 would be in units of partial pressure and both pressure and temperature compensated. If this output were then applied to operational amplifier 41, a pressure and temperature compensated output would be provided in units of gas concentration.

Figure 6:
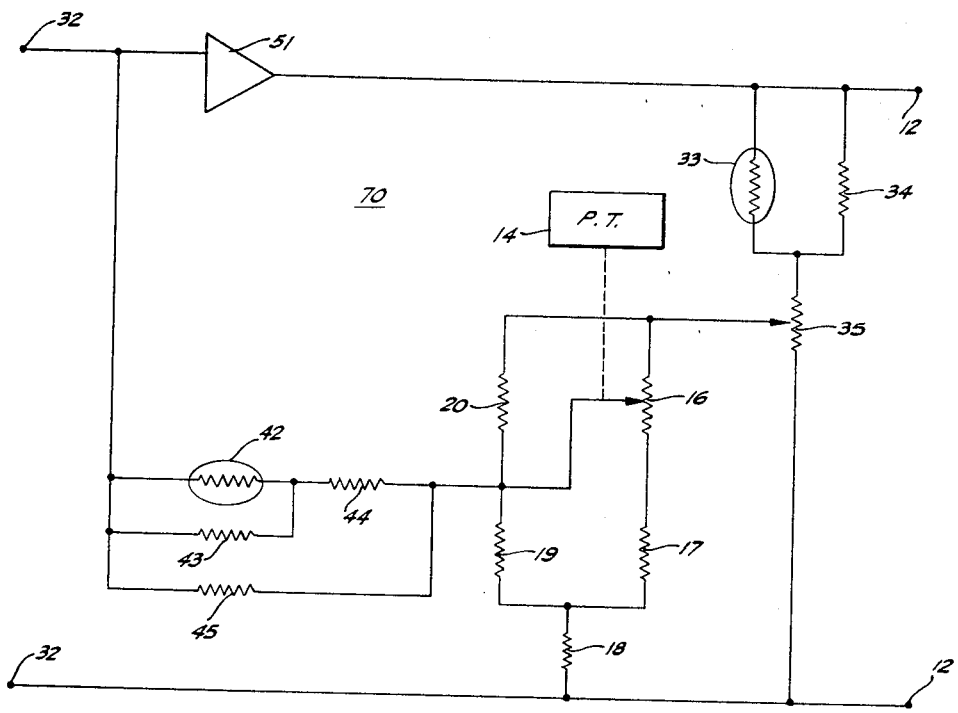
FIGS. 5-7 are circuit diagrams showing the manner in which pressure compensation may be combined with temperature compensation of the output current of a diffusion limited sensor.

Referring now to FIG. 6, there is shown a circuit, generally designated 70, in which the operations of all three networks of circuit 60 are combined into one network, including a single operational amplifier 51. Corresponding elements in both circuits have the same numerals and the components of FIG. 5 which are not required are omitted.

Figure 7:
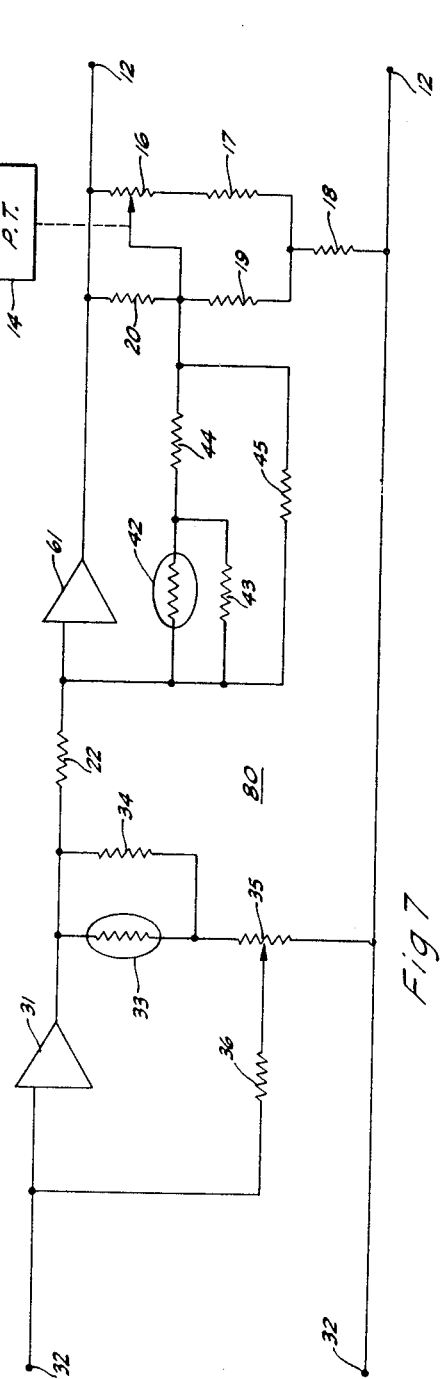

As seen from an inspection of FIG. 6, the three networks in the feed-back circuits of operational amplifiers 31, 41 and 13 of circuit 60 have been combined in the feed-back network of a single operational amplifier 51. Such a configuration has the obvious advantage of requiring fewer parts, although several items require more careful attention. For example, range potentiometer 35 should have a very small resistance value compared to the overall resistance value of the pressure compensation network including resistances 16–20 to avoid having interdependence between membrane temperature and pressure compensation networks. Similarly, the network consisting of thermistor 42 and resistances 43–45 should have a very high impedance compared to the impedance of the pressure compensation networks including resistances 16–20 to avoid interdependence. As a practical matter, if it becomes too difficult to meet all of these conditions without a significant loss of precision when using circuit 70, the circuit of FIG. 7, generally designated 80, may be used in that the impedance matching problems are much less severe. Circuit 80 of FIG. 7 is similar to circuit 60 of FIG. 5 except that the functions of operational amplifiers 13 and 41 have been combined into a single operational amplifier 61, with operational amplifier 31 remaining intact. In circuit 80, components which correspond to those in circuit 60 have the same numerals and those which are not required have been omitted. In circuit 80, the principle change lies in omitting operational amplifier 41 and by substituting the temperature network consisting of thermistor 42 and resistances 43–45 for feed-back resistor 21 of pressure compensating amplifier 13. For optimum precision, the pressure compensating network including resistances 16–20 should have a very low impedance compared to that of the network including thermistor 42 and resistances 43–45.

It can therefore be seen that in accordance with the present invention, there is provided a means for compensating the output signal of a diffusion limited, membrane-type sensor for the effect of hydrostatic pressure variations. The present system performs such compensations simply, without the necessity of complex computations. In spite of its simplicity, the present technique is capable of accurate compensation which will provide an error of less than 1% of dissolved gas reading in the range of 0 to 5,000 p.s.i.

Broadly speaking, the present means for compensating the output signal of a diffusion limited sensor due to changes in pressure operates by performing a mulitplication on the output signal by a function which varies as the reciprocal of the exponential term of the function describing the change in membrane permeability with pressure. According to a preferred embodiment of the invention, such multiplication is achieved, most simply and with minimum expense, by utilizing a pressure-driven, variable resistance in the feed-back loop of an operational amplifier. As represented by circuit 10 in FIG. 1, for example, pressure-driven, variable resistance 16 cooperates with resistances 17–23 and operational amplifier 13 to perform such a multiplication of the input voltage on terminals 11 by the reciprocal of the exponential term of Equation 1 to provide an output which is independent of hydrostatic pressure. However, although the use of a pressure-driven, variable resistance in the feed-back loop of an operational amplifier to achieve compensation is the simplest and least expensive approach available, it will be apparent to those skilled in the art that the present invention is not limited to such means. More specifically, it will be appreciated that analog computers of the servo type are equally suitable for performing the compensation and that strain gage type pressure transducers can be used with appropriate amplification and ratioing circuitry. Finally, Equation 1 provides a means of computing the pressure compensation with any means whatsoever, provided the pressure is known. Accordingly, it is to be understood that the invention is not to be limited by the specific illustrative embodiments, but only by the scope of the appended claims.

I claim:

1. In a sensor for measuring the quantity of a substance in a composition of matter of the type including a membrane which is permeable to said substance, the permeability of said membrane being a defined function of the pressure thereon, said sensor providing an electrical output signal which is a function of the quantity of said substance in said composition of matter, the improvement wherein means are provided for compensating said output signal for changes in the permeability of said membrane due to changes in pressure, said compensating means comprising:
   electrical circuit means having a value which is a function of pressure, said circuit means being mounted to be responsive to changes in pressure on said membrane; and
   multiplication means including said electrical circuit means for multiplying said output signal by the reciprocal of said defined function of pressure to provide a resultant signal which is pressure compensated.

2. In a sensor according to claim 1, the improvement wherein said electrical circuit means comprises:
   a variable resistance, the value of which is a function of pressure.

3. In a sensor according to claim 2, the improvement wherein said multiplication means comprises:
   an operational amplifier having a feed-back loop, said feed-back loop including said pressure-driven, variable resistance.

4. In a sensor according to claim 1, the improvement wherein said electrical circuit means comprises:
   a variable resistance, the value of which is a function of the pressure on said membrane; and wherein said multiplication means comprises:
   an operational amplifier responsive to said output signal, said variable resistance being connected in circuit with said operational amplifier for varying the gain thereof.

5. In a sensor according to claim 4, the improvement wherein said variable resistance has an arm movable in response to changes in pressure and wherein said multiplication means further comprises:
   first and second fixed resistances connected in series, one end of said first resistance being connected to one end of said variable resistance; and
   third and fourth fixed resistance connected in series between the other end of said variable resistance and the junction between said first and second resistances, said arm of said variable resistance being connected to the junction between said third and fourth resistances.

6. In a sensor for measuring the quantity of a substance in a composition of matter of the type including a membrane which is permeable to said substance, the permeability of said membrane being a function of temperature and pressure, said sensor providing an electrical output signal which is a function of the quantity of said substance in said composition of matter, the improvement wherein means are provided for compensating said output signal for changes in the permeability of said membrane due to changes in temperature and pressure, said compensating means comprising:
   first electrical circuit means having a value which is a function of temperature, said circuit means being mounted to be responsive to changes in temperature on said membrane;
   second electrical circuit means having a value which is a function of pressure, said circuit means being mounted to be responsive to changes in pressure on said membrane; and
   multiplication means including said first and second electrical circuit means for multiplying said output signal by a function which varies in accordance with the variation of said membrane with temperature and pressure to provide a resultant signal which is temperature and pressure compensated.

7. In a sensor according to claim 6, the improvement further comprising:
   third electrical circuit means having a value which is a function of temperature, said circuit means being mounted to be responsive to changes in temperature of said composition of matter, and wherein said multiplication means further includes said third electrical circuit means and is further operative to multiply said output signal by a function which varies in accordance with the variation of the solubility of said substance with temperature to provide said resultant signal which is proportional to the concentration of said substance in said composition.

8. In a sensor according to claim 7, the improvement wherein said first electrical circuit means comprises a first thermistor, wherein said second electrical circuit means comprises a variable resistance, the value of which is a function of pressure, wherein said third electrical circuit means comprises a second thermistor, and wherein said multiplication means comprises:
   a first operational amplifier having a feed-back loop, said feed-back loop including said first thermistor, said first operational amplifier being responsive to said electrical output signal from said sensor and providing a temperature compensated output signal which is propotional to the partial pressure of said substance in said composition;
   a second operational amplifier having a feed-back loop, said feed-back loop including said second thermistor, said second operational amplifier being responsive to the output of said first operational amplifier and providing an output signal which is proportional to the concentration of said substance in said composition; and a third operational amplifier having a feed-back loop, said feed-back loop including said pressure-driven, variable resistance, said second operational amplifier being responsive to the output of said first operational amplifier and providing an output signal which is temperature and pressure compensated.

9. In a sensor according to claim 8, the improvement wherein said second operational amplifier receives the output of said first operational amplifier and wherein said third operational amplifier receives the output of said second operational amplifier whereby the output signal of said third operational amplifier is temperature and pressure compensated and proportional to the concentration of said substance in said composition of matter.

10. In a sensor according to claim 8, the improvement wherein said third operational amplifier receives the output of said first operational amplifier and wherein said second operational amplifier receives the output of said third operational amplifier whereby the output signal of said third operational amplifier is temperature and pressure compensated and proportional to the partial pressure of said substance in said composition and the output signal of said second operational amplifier is temperature and pressure compensated and proportional to the concentration of said substance in said composition.

11. In a sensor according to claim 7, the improvement wherein said first electrical circuit means comprises a first thermistor, wherein said second electrical circuit means comprises a variable resistance, the value of which is a function of pressure, wherein said third electrical circuit means comprises a second thermistor, and wherein said multiplication means comprises:
  an operational amplifier having a feed-back loop, said feed-back loop including said first and second thermistors and said pressure-driven, variable resistance, said operational amplifier being response to said electrical output signal from said sensor and providing said resultant signal.

12. In a sensor according to claim 7, the improvement wherein said first electrical circuit means comprises a first thermistor, wherein said second electrical circuit means comprises a variable resistance, the value of which is a function of pressure, wherein said third electrical circuit means comprises a second thermistor and wherein said multiplication means comprises:
  a first operational amplifier having a feed-back loop, said feed-back loop including said first thermistor, said first operational amplifier being responsive to said electrical output signal from said sensor and providing an output signal which is temperature compensated and proportional to the partial pressure of said substance in said composition; and
  a second operational amplifier having a feed-back loop, said feed-back loop including said second thermistor and said pressure-driven, variable resistance, said second operational amplifier being responsive to the output of said first operational amplifier and providing said resultant signal.

13. In a sensor according to claim 12, the improvement wherein said first electrical circuit means comprises a thermistor, wherein said second electrical circuit means comprises a variable resistance, the value of which is a function of pressure, and wherein said multiplication means comprises:
  a first operational amplifier having a feed-back loop, said feed-back loop including said thermistor, said first operational amplifier being responsive to said electrical output signal from said sensor and providing an output signal which is temperature compensated and proportional to the partial pressure of said substance in said composition; and
  a second operational amplifier having a feed-back loop, said feed-back loop including said pressure-driven, variable resistance, said second operational amplifier being responsive to the ouptut of said first operational amplifier and providing said resultant signal.

14. In a sensor according to claim 6, the improvement wherein said first electrical circuit means comprises a thermistor, wherein said second electrical circuit means comprises a variable resistance, the value of which is a function of pressure, and wherein said multiplications means comprises:
  an operational amplifier having a feed-back loop, said feed-back loop including said thermistor and said pressure-driven, variable resistance, said operational amplifier being responsive to said electrical output signal from said sensor and providing an output signal which is temperature and pressure compensated and proportional to the partial pressure of said substance in said composition.

References Cited

UNITED STATES PATENTS

| | | | |
|---|---|---|---|
| 3,510,421 | 5/1970 | Gealt | 204—195 |
| 2,763,151 | 9/1956 | Richardson | 73—27 A |
| 2,815,659 | 12/1957 | Krupp | 73—27 A |
| 3,528,904 | 9/1970 | Cliffgard | 204—195 |

OTHER REFERENCES

Roy D. Gaul et al., "Marine Sciences Instrumentation," vol. 1, pp. 334–339 (1962).

GERALD L. KAPLAN, Primary Examiner

U.S. Cl. X.R.

324—29